United States Patent
Sim et al.

(10) Patent No.: US 9,141,697 B2
(45) Date of Patent: Sep. 22, 2015

(54) METHOD, SYSTEM AND COMPUTER-READABLE STORAGE MEDIUM FOR DETECTING TRAP OF WEB-BASED PERPETUAL CALENDAR AND BUILDING RETRIEVAL DATABASE USING THE SAME

(75) Inventors: Dong Yun Sim, Seongnam-si (KR); Chaehyun Lee, Seongnam-si (KR)

(73) Assignee: NHN CORPORATION, Seongnam-si (KR)

( * ) Notice: Subject to any disclaimer, the term of this patent is extended or adjusted under 35 U.S.C. 154(b) by 1045 days.

(21) Appl. No.: 13/152,017

(22) Filed: Jun. 2, 2011

(65) Prior Publication Data

US 2011/0320414 A1    Dec. 29, 2011

(30) Foreign Application Priority Data

Jun. 28, 2010  (KR) ........................ 10-2010-0060991

(51) Int. Cl.
*G06F 17/30*    (2006.01)

(52) U.S. Cl.
CPC .............................. *G06F 17/30861* (2013.01)

(58) Field of Classification Search
CPC ............................................... G06F 17/30864
USPC ......................................... 707/690, E17.005
See application file for complete search history.

(56) References Cited

U.S. PATENT DOCUMENTS

| | | | |
|---|---|---|---|
| 6,546,380 B1 * | 4/2003 | Lautzenheiser et al. | 706/47 |
| 6,631,369 B1 * | 10/2003 | Meyerzon et al. | 1/1 |
| 2007/0277091 A1 * | 11/2007 | Torigoe et al. | 715/511 |
| 2008/0091685 A1 * | 4/2008 | Garg et al. | 707/10 |
| 2009/0287641 A1 * | 11/2009 | Rahm | 707/3 |
| 2011/0282859 A1 * | 11/2011 | Ionescu | 707/709 |

OTHER PUBLICATIONS

Rui Chen, B.C. Desai, Cong Zhou, "CINDI Robot: an Intelligent Web Crawler Based on Multi-level Inspection", Sep. 6-8, 2007, Database Engineering and Applications Symposium, 2007. IDEAS 2007. 11th International, pp. 93-101.*
Rui Chen, B.C. Desai, Cong Zhou, "CINDI Robot: an Intelligent Web Crawler Based on Multi-level Inspection", Sep. 6-8, 2007, Database Engineering and Applications Symposium, 2007. Ideas 2007. 1 I th International, pp. 93-101.*

* cited by examiner

*Primary Examiner* — Hosain Alam
*Assistant Examiner* — Robert F May
(74) *Attorney, Agent, or Firm* — Greer Burns & Crain Ltd.

(57) ABSTRACT

The present disclosure relates to a method, system and software executable by a processor associated with non-transitory computer-readable storage medium for detecting a trap of web-based calendar pages and building a retrieval database. According to an aspect of the disclosure, detecting a trap of web-based calendar pages includes clustering, by a clustering module, URLs corresponding to web pages stored in a database according to a predetermined standard, generating a regular expression by analyzing a date pattern included in a clustering result, and detecting, a cluster suspected of being a trap of web-based perpetual calendar pages using the generated regular expression.

19 Claims, 4 Drawing Sheets

METHOD, SYSTEM AND COMPUTER-READABLE STORAGE MEDIUM FOR DETECTING TRAP OF WEB-BASED PERPETUAL CALENDAR AND BUILDING RETRIEVAL DATABASE USING THE SAME

CROSS-REFERENCE TO RELATED APPLICATION

This application claims priority to and the benefit of Korean Patent Application No. 10-2010-0060991, filed on Jun. 28, 2010, which is hereby incorporated by reference for all purposes as if fully set forth herein.

BACKGROUND OF THE INVENTION

1. Field of the Invention

Exemplary embodiments of the present invention relate to a method, system and software executed by a processor associated with a non-transitory computer-readable storage medium to detect a trap of a web-based calendar page and to provide retrieval data. More particularly, exemplary embodiments of the present invention relate to generation of a regular expression based on characteristics of a web-based calendar page, to detection of a trap of web-based calendar pages through the regular expression, and to building of a retrieval database by deleting the detected web trap from a database and subsequent application of the generated regular expression.

2. Discussion of the Related Art

As the Internet access continues to increase, users increasingly depend upon Internet search engines in a quick and simple way to obtain information. For example, users connect to an Internet search engine by inputting an identifier such as a Uniform Resource Locator (URL) to an address bar of a web browser using a terminal such as a personal computer via network associated with inputting search words to obtain results related to various fields of information, such as news, knowledge, games, communities, and web pages.

As such, in order to provide suitable content for users, a provider of the Internet search engine has developed a search engine which is capable of collecting suitable web pages, indexing the collected web pages, and providing retrieval results to the users based on the indexed web pages. In particular, web crawlers are mainly used to index the World Wide Web in a methodical and automated manner.

As an operating method of the web crawler, the web crawler generally starts with a list of URLs to visit, called "seeds". Then, the crawler identifies all of the hyperlinks in the seeds and renews the list of URLs, which in turn are recursively visited again.

However, a conventional web-based calendar page may include hyperlinks to web pages for linking references to previous and subsequent months or hyperlinks to other web pages for linking references to previous and subsequent years, weeks, and days so that hyperlinks to web pages of unnecessary dates can be generated. If web-based calendar pages are collected by an existing web crawler in this manner, unnecessary or meaningless web pages can be continuously collected due to a web trap by the infinite hyperlink loop, thereby causing to consume a storage space for storing the collected results which result in poor performance of the web crawler. Moreover, an increase in the amount of unnecessary or meaningless web pages entails an increase in load to the search engine.

Therefore, there is a need for an approach to improve the problems described above.

SUMMARY OF THE INVENTION

Exemplary embodiments of the present invention provide relate to a method, system and software to detect a trap of a web-based calendar page and to provide retrieval data.

Additional features of the invention will be set forth in the description which follows, and in part will be apparent from the description, or may be learned by practice of the invention.

Exemplary embodiments of the present invention disclose a method of detecting a web trap. The method comprises clustering a uniform resource locator (URL) corresponding to a web page stored in a database according to a predetermined standard. The method also comprises generating a regular expression by analyzing a date pattern associated with a clustering result. The method further comprises detecting a suspected cluster which causes an unwanted number of requests associated with infinite linking dynamic pages of a web-based calendar by using the generated regular expression.

Exemplary embodiments of the present invention disclose a system for detecting a trap of web-based calendar pages. The system includes a clustering module configured to cluster URL corresponding to a web page stored in a database according to a predetermined standard. The system also includes a date pattern detection module configured to analyze a date pattern associated with a clustering result to generate a regular expression. The system further includes a web trap identification module configured to detect a suspected cluster which causes an unwanted number of requests associated with infinite linking dynamic pages of web-based calendar by using the generated regular expression.

Exemplary embodiments of the present invention disclose a non-transitory computer-readable storage medium comprising an executable program, which when executed performs the step of clustering URLs corresponding to web pages stored in a database according to a predetermined standard. The step includes generating a regular expression by analyzing a date pattern associated with a clustering result. The step also includes detecting a suspected cluster which causes an unwanted number of requests associated with infinite linking dynamic pages of a web-based calendar by using the generated regular expression.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
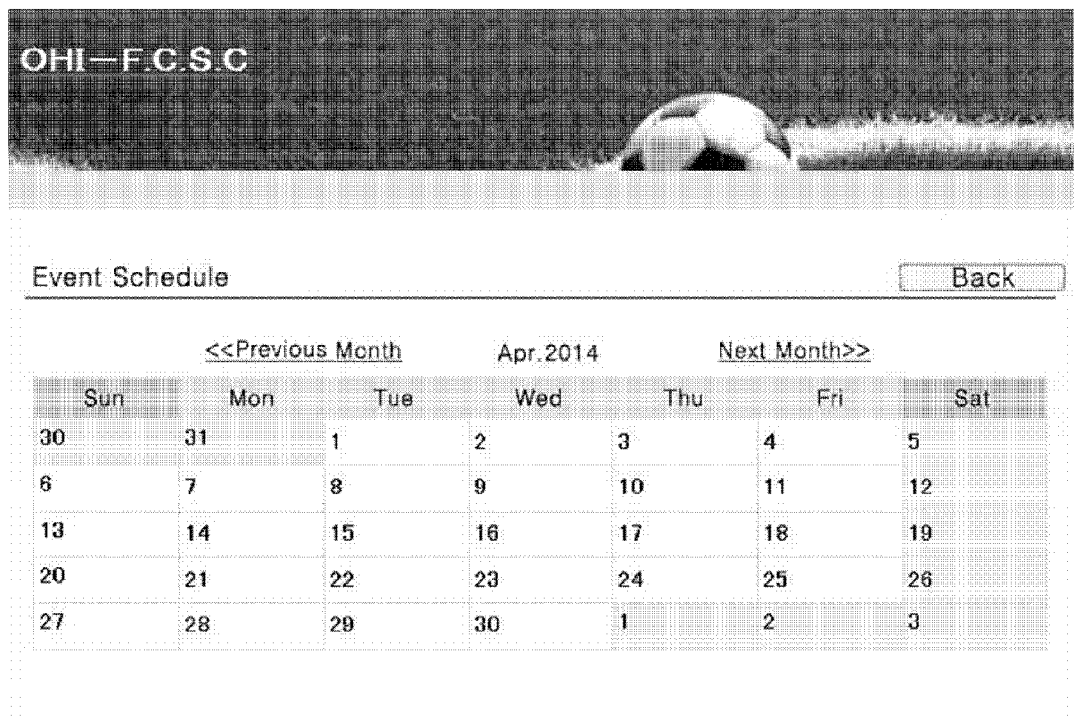
FIG. 1 shows an example of a web-based calendar page in accordance with exemplary embodiments of the present invention.

Exemplary embodiments of the present invention will now be described in detail with reference to the accompanying drawings. The following embodiments are given by way of illustration to provide a thorough understanding of the invention to those skilled in the art. Hence, it should be understood that the embodiments of the present disclosure are different from each other but are not exclusive with respect to each other. For example, certain shapes, configurations and features disclosed herein may be realized by other embodiments without departing from the spirit and scope of the invention. Further, it should be understood that positions and arrangement of individual components in each of the embodiments may be changed without departing from the spirit and scope of the invention.

Therefore, the following detailed description should not be construed as limiting the claims to the specific embodiments, but should be construed as including all possible embodiments along with the full scope of equivalents to which such claims are entitled. Like elements are denoted by like reference numerals throughout the specification and drawings.

It is understood that when a certain element is referred to as being "connected" or "coupled" to another element, the element can be not only "directly connected" to the other element, but can also be "electrically connected" thereto with an intervening element disposed therebetween. Further, it is understood that the term "comprise" and derivatives thereof, as used herein, are intended to be open ended terms that specify the presence of certain features, elements, components and/or steps, but do not intended to exclude the presence of other unstated features, elements, components and/or steps.

As used herein, the term "web page" should be construed as referring to any type of passive or active document that might be used to interact with a user through a web browser such as Internet Explorer. For example, a typical web page may refer to hypertext markup language (HTML) documents, but may also include various documents, which can be written in a mark-up language including, and may refer to extensible markup language (XML), standard generalized markup language (SGML), and can be used to interact with a user through a web browser. In order to interact with a certain web page through the web browser, a user inputs a URL, which is the address of the web page on the World Wide Web and generally has, but is not limited to, the address format of hypertext transfer protocol (HTTP).

Further, as used herein, the term "web-based calendar" is a broad concept indicating a web-based calendar page that includes hyperlinks to web-based calendar pages as references for displaying previous and subsequent days, weeks, months, and years. Such a web-based calendar page may be characterized in that it may include the hyperlinks to other web-based calendar pages for displaying previous and subsequent days, weeks, months, and years, thereby allowing a user to view the other web-based calendar pages through the hyperlinks on the web-based calendar page. This and other features of the web-based perpetual calendar page will be described in more detail below.

Further, as used herein, the term "URL (Uniform Resource Locator)" refers to a unique address that specifies the location of a file on a server connected to the Internet, and may include various kinds of services, the location of a server (domain name) and the location of a file. The general syntax of a URL may have the format of "protocol://hostname/path/filename-?parameter." The path may include a plurality of paths and the parameter may also include a plurality of parameters. For example, for a URL of "http://www.naver.com/a/b/c.html?x=1&y=2," the protocol is "http," the hostname is "www.naver.com," the path is "/a/b/," the filename is "c.html," and the parameters are "x" and "y," which have values of 1 and 2, respectively.

To detect a web-based perpetual calendar page, the characteristics of the web-based perpetual calendar page are described. The web-based perpetual calendar page has the following characteristics distinguishing it from conventional web pages.

For example, a date pattern may be included in a URL. Specifically, the date pattern may be indicated by a path or parameter except for a hostname of the URL. For example, assuming a URL including a certain date pattern in the path is expressed by "http://www.naver.com/cal/2009/02," the date pattern indicating February, 2009 is included in a path of "/cal/2009/02." Further, assuming a URL including a certain date pattern in the parameter is expressed by "http://www.naver.com/cal.php?month=02&year=2009," the date pattern indicating February, 2009 is included in parameters of "month" and "year." As such, it is contemplated that the date pattern may be expressed by the path or the parameter in various manners.

As shown in FIG. 1, the web-based calendar page may include a table which shows a calendar. To detect whether a table showing a calendar is present in the web-based calendar page, for example, it may be determined whether a specific html tag such as <table> for indicating a table is included in the web page, whether numbers from 1 to 28 or more and/or days of the week are included in the web page, and whether the table in the web page includes seven columns from Sunday to Saturday. In this manner, it may be determined whether the web page includes a table showing a calendar by using various other features of the calendar.

As shown in FIG. 1, the web-based calendar page may include hyperlinks to web pages showing previous/subsequent months or weeks. To determine whether such hyperlinks are present in the web-based calendar page, the URL of the current web page may be compared with a URL of a web page to which the current web page is hyperlinked. For example, if the URL of the current web page has a parameter of "caldate=1992-1-12" and the URL of the web page hyperlinked by the current web page has parameters of "caldate=1992-1-5" and "caldate=1992-1-19," it can be determined by comparing the parameters whether the current web page is the web-based calendar page since the current web page includes the hyperlinks to the web pages which represent immediate previous/subsequent months or weeks.

In some examples, the web-based calendar page is configured to allow a user to follow a web page corresponding to a desired date, instead of generating an error message of HTTP 404 indicating that the corresponding web page is not found, when the user wants to follow the web page corresponding to the desired date based on analysis of the URL. For example, when a date corresponding to January, 1992 is detected from the parameter of a previously collected URL, a user can interact with a web page corresponding to a changed date, for example, January, 1975 or January, 2020, by inputting a new URL into a web browser, in which the date of January, 1992 of the collected URL is substituted by the date corresponding to January, 1975 or January, 2020.

In examples, the web-based calendar page is empty or has the same content as those of other web-based calendar pages. For example, if a certain web-based calendar page is provided in the form of a diary, an infinite number of web pages may be presented through infinite hyperlinks, however a size of the content data with respect to the number of web pages may be substantially small. Since most of the web pages may be empty or may have the same content, it can be possible to determine the size of the content data of the web pages in a specific range.

Such characteristics of the web-based calendar page may cause a web crawler to collect web pages relating to unnecessary dates due to infinitely generating hyperlinks, i.e., to be caught in a trap of web-based calendar pages, when collecting the web-based calendar pages through hyperlinks. Therefore, the unnecessary web pages attributed to the web trap should be deleted from the web pages collected by the web crawler. In some examples, when determining whether a certain web page is a web-based calendar page, one or more of the aforementioned inherent characteristics of the web-based calendar page may be used, and the unnecessary web-based calendar pages collected due to the web trap are then ascertained and deleted based on the determination.

Figure 2:
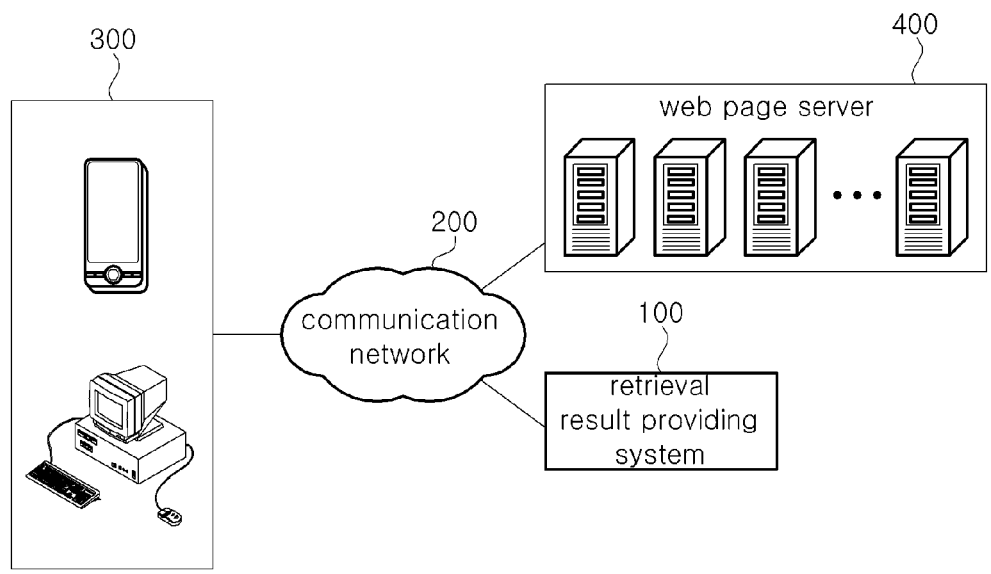
FIG. 2 shows a system diagram capable of detecting a trap of web-based calendars and providing retrieval results using a retrieval database based on the detection result in accordance with exemplary embodiments of the present invention

FIG. 2 shows an overall configuration of a system that is capable of detecting a trap of web-based calendars and providing retrieval results using a retrieval database based on the detection result in accordance with exemplary embodiments of the present invention.

Referring to FIG. 2, the system may include a retrieval result providing system 100, which is connected to multiple user terminal 300 and multiple web page servers 400 via a communication network 200.

In some examples, the retrieval result providing system 100 may receive a search word, for example, a query, from a user terminal 300, and search for content corresponding to the query with reference to a retrieval database (not show), and to send retrieval results to the user terminal 300. For example, the retrieval result providing system 100 may generate a regular expression in order to detect a trap of web-based calendar pages among web pages collected from the multiple web servers 400 using a web crawler (not shown), remove, based on the regular expression, some or all of the web pages collected due to the web trap from the collected web pages, and allow the regular expression to be applied upon subsequent operation of the web crawler (not shown).

For example, the communication network 200 may be constructed in any form, such as a personal area network (PAN), a local area network (LAN), a metropolitan area network (MAN), and a wide area network (WAN) so as to realize wired or wireless communication without being limited to a particular mode.

In some examples, the user terminal 300 may have an input/output unit capable of connecting to the retrieval result providing system 100 through the network 200 to receive a retrieval result with respect to a query input by a user. Any digital device, such as desktop computers, notebook computers, work stations, palmtop computers, personal digital assistants (PDAs), web pads, smart phones, and other mobile communication terminals may be used as the user terminal 300 so long as such device includes a memory and a microprocessor to achieve an operation capability. For example, the user terminal 300 may be connected to the retrieval result providing system 100 such that a web browser in the user terminal 300 can be driven to input a query and receive a result corresponding to the query. Of course, the user terminal 300 may be operated in other ways.

In some examples, the web page server 400 may comprise one or more web servers that include web pages to be collected by the web crawler in the retrieval result providing system 100. It should be understood that any web server allowing the web crawler to access through the communication network 200 and to collect the web pages can be deployed in the concept of the web page server 400 according to exemplary embodiments of the present invention. For example, the web page server 400 may include web-based calendar pages.

Figure 3:
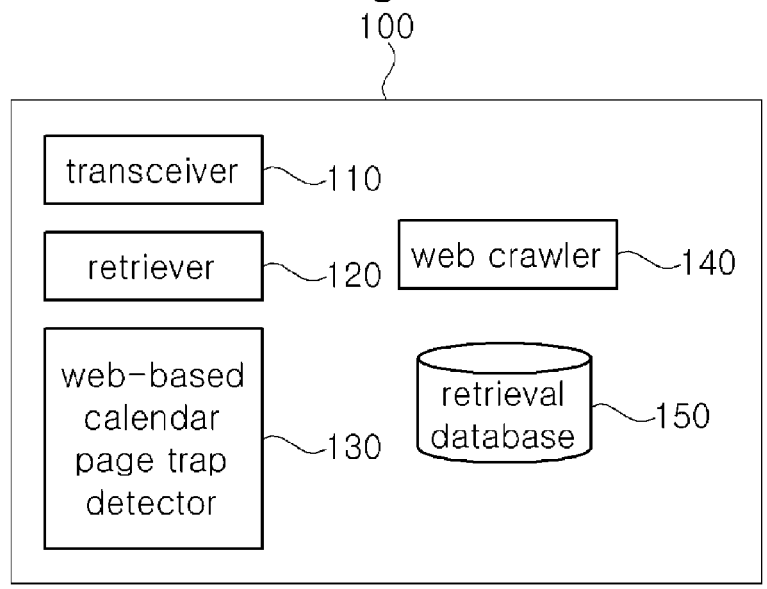
FIG. 3 is a block diagram capable of supporting the system of FIG. 2.

FIG. 3 is a block diagram capable of supporting the system of FIG. 2, in accordance with exemplary embodiments of the present invention.

Referring to FIG. 3, in some examples, the retrieval result providing system 100 may include a transceiver 110, a retriever 120, a web-based calendar page trap detector 130, a web crawler 140 and a retrieval database 150.

The transceiver 110 may receive a query from the user terminal 300, send the query to the retriever 120, and send retrieval results extracted from the retriever to the user terminal 300.

When receiving the query from the transceiver 110, the retriever 120 may search for information matching the query from the retrieval database 150. The extracted retrieval results may be sent to the user terminal 300 via the transceiver 110.

The web-based calendar page trap detector 130 may generate a regular expression to determine whether a web-based perpetual calendar page is present in web pages stored in the retrieval database 150 or separate database (not shown), and may delete some or all unnecessary web pages collected by the web crawler caught in a trap of web-based calendar pages from the retrieval database 150 or the separate database through application of the generated regular expression and conditions. For example, the web-based calendar page trap detector 130 may be set using the generated regular expression and conditions so as not to collect web pages pertaining to the regular expression and the conditions in subsequent operation of the web crawler 140. The respective components of the web-based perpetual calendar page trap detector 130 are described in more detail hereinafter.

The web crawler 140 may serve to search for and may collect web pages stored in the web page server 140 in a known systematic and automated method, and may store the collected web page in the retrieval database 150 or the separate database (not shown). The web crawler 140 may be set to carry out this operation or not to carry out this operation according to a certain condition.

The retrieval database 150 may include various data collected or stored to provide a retrieval result corresponding to a query from a user, and web pages collected by the web crawler 140. Further, when the unnecessary web pages are stored in the retrieval database 150 due to the trap of web-based calendar pages during operation of the web-based calendar page trap detector 130, some or all of the unnecessary web pages may be deleted therefrom.

Although FIG. 3 shows only the retrieval database 150, the system may further include a separate database for storing web pages collected and detected by the web crawler 140 and the web-based calendar page trap detector 130, such that the retrieval database 150 can store indexed web pages, which remain after removing some or all of the web pages selected due to the trap of web-based perpetual calendar pages from the collected web pages. Further, the transceiver 110, the retriever 120, the web-based calendar page trap detector 130 and the web crawler 140 may be integrated into a single unit or may be independently implemented by different units. Alternatively, by way of configurations, these components may be implemented by a plurality of units that have the same function and are arranged in parallel. As such, it will be apparent to those skilled in the art that each of the components may be designed in various ways without being limited to the number and position of deployed units or databases.

Figure 4:
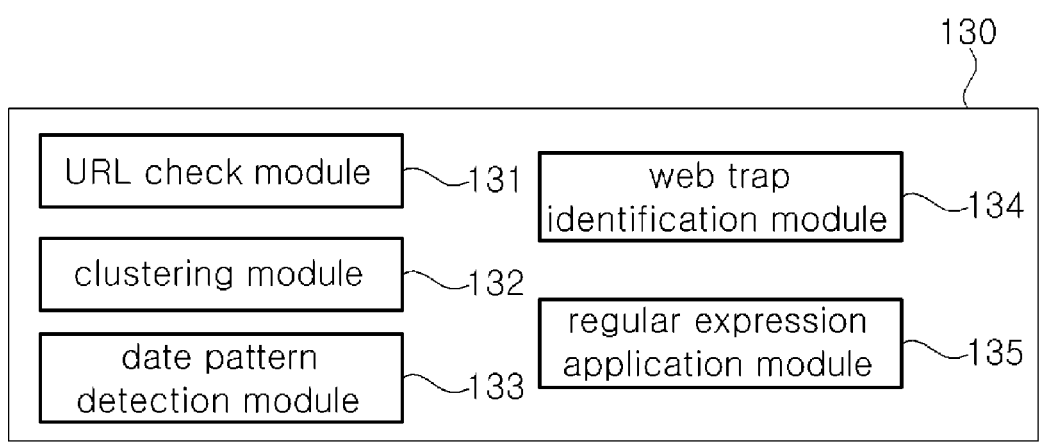
FIG. 4 is a block diagram capable of supporting a web-based perpetual calendar page trap detection associated with the system of FIG. 2.

Next, the web-based calendar page trap detector 130 of the retrieval result providing system 100 is described in more detail with reference to FIG. 4. The web-based calendar page trap detector 130 may include, for example, a URL check module 131, a clustering module 132, a date pattern detection module 133, a web trap identification module 134, and a regular expression application module 135.

In some examples, the URL check module 131 checks URLs of web pages according to a predetermined standard to determine whether there is a web page collected by the web crawler 140 from the trap of web-based calendar pages among web pages collected by the web crawler 140 and stored in the retrieval database 150 or the separate database. For example, based on the characteristics of the web-based calendar page which includes a date pattern in a URL to show a certain year, month or day as described above, the URL check module 131 may be configured to check the URLs of the web pages in the case where the URL has all of five numerals in the path or parameter of the URL except for the hostname and four or more numerals are consecutively included in the path or parameter. By checking the URLs of the web pages in this manner, it is possible to reduce the number of web pages to be checked to determine whether there is a web page collected from the trap of web-based calendar pages, thereby significantly reducing processing costs and speed.

In some examples, the clustering module 132 may gather the URLs of the web pages, which are not checked by the URL check module 131, into a cluster which does not satisfy a predetermined standard. Specifically, the clustering module 132 may perform a host clustering function for gathering URLs having the same hostname. For example, since multiple URLs listed in Table 1 have the same hostname, these URLs can be clustered into a single URL list.

TABLE 1

| | URL |
|---|---|
| First URL | http://www.naver.com/cal/2009/02/ |
| Second URL | http://www.naver.com/cal/2009/03/ |
| Third URL | http://www.naver.com/cal.php?y=2010&m=02&session=ok |
| Fourth URL | http://www.naver.com/cal.php?y=2010&m=03 |
| Fifth URL | http://www.naver.com/cal.php?y=2008&m=05 |

In some examples, the clustering module 132 may perform path clustering with respect to a path of each of the URLs shown in Table 1 to regularize the URLs by replacing numerals using replacers in each path of the URL list. For the first and second URLs in Table 1, the regularized URL list can be expressed by "http://www.naver.com/cal/<numeral 1>/<numeral 2>/" and the like after path clustering, in which <numeral 1> and <numeral 2> are replacers for regularization.

In addition to or independent of the path clustering, the clustering module 132 may perform parameter clustering with respect to each of the URLs to regularize the parameter of the URLs, except for a value assigned to each of the parameters and parameters included only in some URLs. For the third to fourth URLs in Table 1, parameter clustering is performed with respect to the remaining parameters, except for "2010", "02", "03", "2008", "05" and "ok" which are values assigned to the parameters, and "session" which is the parameter included only in the third URL session so that the regularized URL may be expressed by "http://www.naver.com/cal.php?y=&m=".

Clustering operation of the clustering module 132 may be performed with respect to all URLs which have passed the URL check module 131, or with respect to some URLs, which have passed the URL check module 131, to regularize these URLs and apply the clustering operation to the remaining URLs based on the regularized URLs. As such, the operating manner or change of the clustering sequence may be apparent to those skilled in the art. Further, in order to verify a web page collected from the trap of web-based perpetual calendar pages, the clustering module 132 may exclude clustering of a certain URL list per se, by determining whether URLs in this list have a low possibility of being collected from the trap of web-based calendar pages, for example, if the number of URLs included in the list through clustering is 5 or less.

In some examples, the date pattern detection module 133 may determine locations of the date pattern, that is, a location of a year, a location of a month and a location of a day, based on each of URL lists, each of which is gathered into the same cluster by the clustering module 132, to generate a regular expression using a determination result. First, analysis of the date pattern in the parameters or paths shows that the date pattern may be expressed in various ways, as shown in Table 2.

TABLE 2

| Date pattern | Example 1 | Example 2 |
|---|---|---|
| Y_M_D | 2010-04-05 | 2010/04/05 |
| M_D_Y | 12-31-2009 | 12/31/2009 |
| Y_M | 31-12-2009 | 31/12/2009 |
| M_Y | 2010-04 | 2010/04 |
| YMD | 04-2010 | 04/2010 |
| YMD | 20100405 | |
| MDY | 12312009 | |
| DMY | 31122009 | |
| YM | 201004 | |
| MY | 042010 | |

In Table 2, "Y", "M" and "D" of the date pattern refer to a year, a month and a day, respectively, and the sequence thereof may be date pattern. Further, the underline "_" is a delimiter, which can be inserted into the date pattern, and "/" may indicate a reference position to distinguish a parameter from others or to divide a path. As described above, since the web-based calendar page can express a date or a month through a single or multiple paths or parameters, there can be various date patterns as shown in Table 2. For example, a date pattern of "Y_M_D" represents a sequence of year, month and day, and delimiters or references "/" are inserted therein, such that each of "Y", "M" and "D" is substituted for the individual parameters. In Example 1, "2010-04-05" is input to a single parameter having delimiters "-", and in Example 2, "2010/04/05" consisting of multiple paths is inserted as the date pattern. Alternatively, although not shown in Table 2, a multi-parameter such as "y=2010&m=04&d=05" may be used to indicate a year, a month and a day substituted in this order for the individual parameters. Further, a date pattern of "MY" has a sequence of month and year, and means that it has no delimiter inserted therein and is not composed of multiple paths. In Example 1, the overall date pattern of "date=042010" is substituted for a single parameter, in which "04" may indicate month and "2010" may indicate year. In another example, "/042010/" may be inserted into a single path. However, it should be understood that Table 2 is given for illustration only. For example, new date patterns may be added thereto or the existing date pattern may be changed or deleted therefrom.

In some examples, the date pattern shown in Table 2 may be stored in the retrieval database 150 or in the separate database (not shown) to be used by the date pattern detection module 133 to determine the date pattern. For example, the date pattern detection module 133 may extract some URLs from a URL list gathered in the same cluster and compares the date patterns of the extracted URLs with the existing date pattern to determine locations of year, month and day of an anticipated date pattern and a substitution method thereof with reference to the same or the most similar date pattern to the existing date pattern. Comparison with the same or the most similar date pattern may be performed by ascertaining whether numerals obtainable at the locations of a year, a month and a day in the anticipated date pattern are valid. For example, if a numeral obtained at a location of the year may be an integer greater than 0, a numeral obtained at a location of the month may be an integer from 1 to 12, and a numeral obtained at a location of the day may be an integer from 1 to 31. According to detection of the location of numeral of the year, month and day, respectively, it can be determined that the anticipated date pattern is correct.

For example, the date pattern detection module 133 may determine whether the determined date pattern can be applied to all of other URLs in the same cluster. If the date pattern can be applied to all of the other URLs in the same cluster, the regular expression can be generated based on the determined date pattern. Determination as to the applicability of the date pattern may be accomplished by verifying whether the numerals obtainable at the respective locations of the year, the month and the day in each of the URLs are valid, as described above. For example, for a URL having a single parameter of "2009-02-14," the date pattern detection module 133 can determine that the parameter corresponds to Y_M_D, by extracting "2009", "02", and "14" divided by the delimiters with an assumption that "2009", "02", and "14" correspond to locations of year, month and day. The data pattern detection module 133 can determine "2009-02-14" can be the anticipated date pattern, since the "2009", "02", and "14" can be determined valid values as it is determined the "2009" is an integer greater than 0, "02" is an integer from 1 to 12, and "14" is an integer from 1 to 31. For example, the date pattern detection module 133 may extract parameters of all of the remaining URLs, which can be gathered in the same cluster, to determine validities of numerals extracted from the locations of the year, the month and the day of the anticipated date pattern, and to generate a regular expression of the URLs if a plurality or all of the URLs in the cluster pass the date pattern detection module 133. Herein, the term "regular expression" means a general expression to which the plural or all of the URLs in the cluster can be applied. In this example, the regular expression of the URLs may be generated by expressing the values of the parameter, for example, as "([1-3]{1}[0-9]{3})[^0-9]{1}([0-1]?[0-9]{1})[^0-9]{1}([0-3]?[0-9]{1})." Of course, it is apparent to those skilled in the art that the regular expression can be generated in various manners or expressions.

In some examples, a date of a certain web-based calendar page can be marked using a parameter or a path in a URL corresponding to the web page. For example, when the parameter is used to mark the date in the URL, the date can be marked in various ways, such as a single parameter, a multi-parameter, and a delimiter. For example, when the path is used to mark the date in the URL, the date can also be marked in various ways, such as a single path, and a multi-path. Therefore, although the single parameter including the delimiters is illustrated in the above examples, the date pattern detection module 133 may generate a regular expression with respect to each of clustered URL lists, which can be expressed in various ways. For example, the date pattern detection module 133 may compare a date pattern of a certain URL in each of the clustered URL lists with the date pattern having characteristics of each of the URL lists to determine locations of a year, a month and a day, to determine whether determination of the anticipated locations and the substitution method can be applied to other URLs in the same cluster, and to generate the regular expression based on the determination result.

In some examples, the date pattern detection module 133 may filter the determination result as to the date pattern according to the following exemplary method, in addition to or independent of the aforementioned operation. For example, since the web-based calendar page may include the hyperlinks to other web-based calendar pages to display immediate previous and subsequent months or weeks, the date pattern detection module 133 may filter the determination result as to whether a certain URL has the characteristics of the web-based calendar page by determining whether a calendar form is included in a web page having the corresponding URL. For example, it is determined whether numerals from 1 to 28 and a month, a week or a day are present in text of the web page. If the web page of the URL includes hyperlinks, the date pattern detection module 133 extracts the year, the month and the day from a URL corresponding to each of the hyperlinks by matching the URL with the date pattern to determine whether the hyperlinks are hyperlinks to the web-based calendar pages to display immediate previous and subsequent months or weeks, and to compare the extracted date of the URL with the date of the current URL to determine whether there is a difference of one month (28 days to 31 days) or one week (7 days) therebetween, thereby additionally or independently filtering the determination result based upon whether the corresponding URL has the characteristic of the web-based calendar page.

In some examples, the web trap identification module 134 may determine whether a URL of an unnecessary web page collected from the trap of web-based perpetual calendar pages is present in the URL list, which is gathered into the same cluster through the regular expression generated by the date pattern detection module 133, and may determine a criterion to separate the URL from the URL list if such a URL is present in the URL list.

In the trap of the web-based calendar page, the web-based calendar pages are infinitely repeated. Therefore, the web trap identification module 134 may determine, based on such a feature of the web trap, whether a URL related to an unnecessary web page collected from the web trap of web-based calendar pages is included in the URL list, which is gathered into the same cluster, by generating a predetermined number of URLs by inputting certain dates to the date pattern of the generated regular expression and verifying whether the identification module 134 succeeds in visiting each of the URLs. For example, assuming that a regular expression of "^http[s]?://www\.naver\com/cal\.php\?date=([1-3]{1}[0-9]{3})[^0-9]{1}([0-1]?[0-9]{1})&?$" generated from a URL having a single parameter of "date=2009-08," that is, "http://www.naver.com/cal.php?date=2009-02," the web trap identification module 134 may generate URLs as shown in Table 3 and Table 4 by inputting five past dates and five future dates to this regular expression.

TABLE 3

| |
|---|
| http://www.naver.com/cal.php?date=1995-08 |
| http://www.naver.com/cal.php?date=1990-08 |
| http://www.naver.com/cal.php?date=1985-08 |
| http://www.naver.com/cal.php?date=1980-08 |
| http://www.naver.com/cal.php?date=1975-08 |

TABLE 4

| |
|---|
| http://www.naver.com/cal.php?date=2020-08 |
| http://www.naver.com/cal.php?date=2025-08 |
| http://www.naver.com/cal.php?date=2030-08 |
| http://www.naver.com/cal.php?date=2035-08 |
| http://www.naver.com/cal.php?date=2037-08 |

The web trap identification module 134 may attempt to access a certain URL of each of the URL lists generated in Table 3 and Table 4 to ascertain success or failure of access to a web page corresponding to the URL, that is, to determine whether the web page corresponding to the URL is present in the URL list. If the web page corresponding to the URL is present in the URL list, the web trap identification module 134 may determine whether the URL related to the unnecessary web page collected from the web trap is included in the corresponding URL list, which is gathered into the same cluster. In this example, upon receiving an error message such as HTTP 404 in the access attempt, the web trap identification module 134 may determine that the web pages are not collected from the trap of the web-based calendar pages.

In some examples, in addition to or independent of the aforementioned operation, the web trap identification module 134 may separate characteristics of the URL, which is related to the unnecessary web page collected due to the web trap, from the corresponding URL list of the same cluster by the following exemplary method.

According to the characteristics of the web-based calendar pages described above, most of the web-based calendar pages have a size in a specific range. Therefore, the web trap identification module 134 may classify the URLs into clusters according to the web page sizes by a known clustering technique such as X-means clustering or EM clustering, and may detect a trap candidate cluster, the web pages of which are suspected of being the unnecessary web pages collected due to the trap of the web-based calendar page. Such a trap candidate cluster may be detected according to various conditions. For example, with reference to a standard web page, which corresponds to a URL counted a predetermined number or more and has a web page size less than or equal to a standard deviation, the web trap identification module 134 may calculate the maximum and minimum sizes of the web pages which satisfy the standard condition. Further, in order to additionally detect URLs which have irregular characteristics deviating from general detection conditions, the web trap identification module 134 may calculate the maximum and minimum sizes of web pages which can be included in the trap candidate cluster by adding the sizes of web pages, corresponding to URLs counted a predetermined number or more, to the existing conditions. The maximum and minimum sizes of web pages calculated in this example may be considered inherent characteristics of the meaningless web pages collected due to the trap of the web-based calendar pages.

In some examples, the regular expression application module 135 may delete the unnecessary web pages, which are collected due to the trap of web-based calendar pages, among the web pages stored in the existing retrieval database 150 or the separate database by applying a date standard and/or a size range of web pages to the regular expression generated in the URL list of the same cluster, and may set the web crawler 140 to prevent the unnecessary web pages from being collected during the next collection of the web pages by applying the standard and/or the size range to the web crawler 140.

In one application of the regular expression, for example, the regular expression application module 135 may delete all web pages corresponding to URLs which are obtained by applying irregular dates to the regular expression generated by the date pattern detection module 133. For example, if dates before 1995 and after 2020 are applied to the regular expression by assuming these dates to be irregular dates, web pages corresponding to URLs of Nos. 3 to 6 in Table 5 will be deleted from the retrieval database 150 or the separate database, and the web crawler 140 may not collect web pages corresponding to the URLs of these dates in the next collection of web pages.

TABLE 5

| No. | URL | Determination as to deletion |
|---|---|---|
| 1 | http://www.naver.com/cal.php?date=200912 | X |
| 2 | http://www.naver.com/cal.php?date=200805 | X |
| 3 | http://www.naver.com/cal.php?date=199512 | ○ |
| 4 | http://www.naver.com/cal.php?date=193912 | ○ |
| 5 | http://www.naver.com/cal.php?date=196509 | ○ |
| 6 | http://www.naver.com/cal.php?date=202507 | ○ |

In another application of the regular expression, for example, the regular expression application module 135 may filter and delete all URLs corresponding to web pages in a predetermined range (from the minimum web page size to the maximum web page size) from the URL list of the same cluster with reference to the maximum and minimum sizes of the web pages pertaining to the trap candidate cluster generated by the web trap identification module 134. For example, if all URLs of web pages having a size from 14,380 byte to 14,500 byte and from 14,702 to 14,710 are considered unnecessary web pages collected due to the trap of web-based calendar pages to be deleted, web pages corresponding to URLs of Nos. 1 to 3 of Table 6 may be deleted from the retrieval database 150 or the separate database and the web crawler 140 may not collect web pages included in the corresponding size range.

TABLE 6

| No. | URL | Size | Determination as to deletion |
|---|---|---|---|
| 1 | http://www.naver.com/cal.php?date=193912 | 14,380 | ○ |
| 2 | http://www.naver.com/cal.php?date=194607 | 14,500 | ○ |
| 3 | http://www.naver.com/cal.php?date=196509 | 14,464 | ○ |
| 4 | http://www.naver.com/cal.php?date=200605 | 12,247 | X |
| 5 | http://www.naver.com/cal.php?date=200912 | 12,388 | X |

These two applications of the regular expression are given for illustration only and can be used in an exemplary practice by the regular expression application module 135. Therefore, it should be noted that various applications of the regular expression may be used, or modified to provide the same or similar function by various methods according to the technical level and technical common sense of those skilled in the art.

Figure 5:
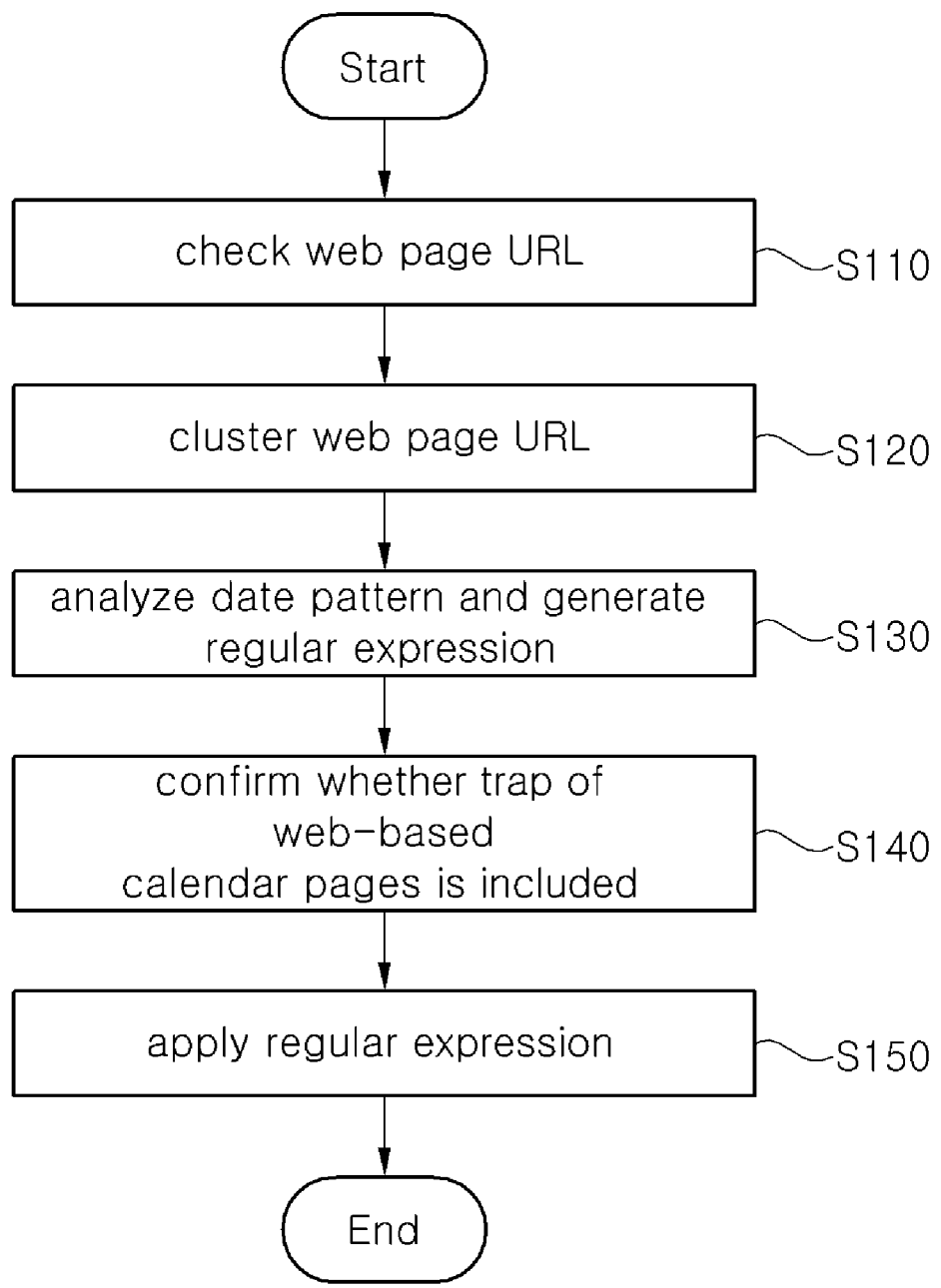
FIG. 5 is a flowchart of a process for an operation of the web-based calendar page trap detector in accordance with exemplary embodiments of the present invention.

FIG. 5 is a flowchart of a process for an operation of the web-based calendar page trap detector in accordance with exemplary embodiments of the present invention.

Referring to FIG. 5, a work flow of the web-based calendar page trap detector 130 is described hereinafter. For example, the URL check module 131 may check web pages collected by the web crawler 140 and may store in the retrieval database 150 or the separate database in S110 to determine whether there is a web page, collected due to the trap of web-based perpetual calendar pages, among the collected web pages. The detection standard of the URL check module 131 is described above in various examples, and a detailed description thereof will be omitted to avoid unnecessary obscuring the present invention.

In some examples, as in step S110, the clustering module 132 may gather URLs of web pages, which may have suspected form of the web-based calendar page by the URL check module 131, into a cluster corresponding to a predetermined standard in S120. For example, the clustering module 132 may perform host clustering, by which URL lists having the same host are clustered into a single list.

As in step S130, the date pattern detection module 133 determines the configuration of a date pattern, that is, locations of year, month and day, based on each of URL lists, each of which is gathered into the same cluster in the previous step to generate a regular expression using the determination result. It is noted that detailed analysis of the date pattern displayed on the parameter or the path and the method of generating the regular expression are described above in detail.

In step S140, the web trap identification module 134 may determine whether a URL of a meaningless web page collected due to the trap of web-based calendar pages is present in the URL list, which is gathered into the same cluster through the regular expression generated per step S130. For example, per step S140, the web trap identification module 134 may generate URLs by inputting certain dates to the date pattern of the regular expression and may access the URLs to verify whether the identification module 134 succeeds in visiting each of the URLs. The web trap identification module 134 may identify the web trap using various other methods, which are described above.

As in step S150, the regular expression application module 135 may delete the meaningless web pages, which are collected due to the trap of web-based calendar pages, among the web pages stored in the existing retrieval database 150 or the separate database by applying a specific standard or range to the regular expression generated in the URL list of the same cluster, and may set the web crawler 140 to prevent the unnecessary web pages from being collected during the next collection of the web pages by applying the standard and/or the size range to the web crawler 140.

Figure 6:
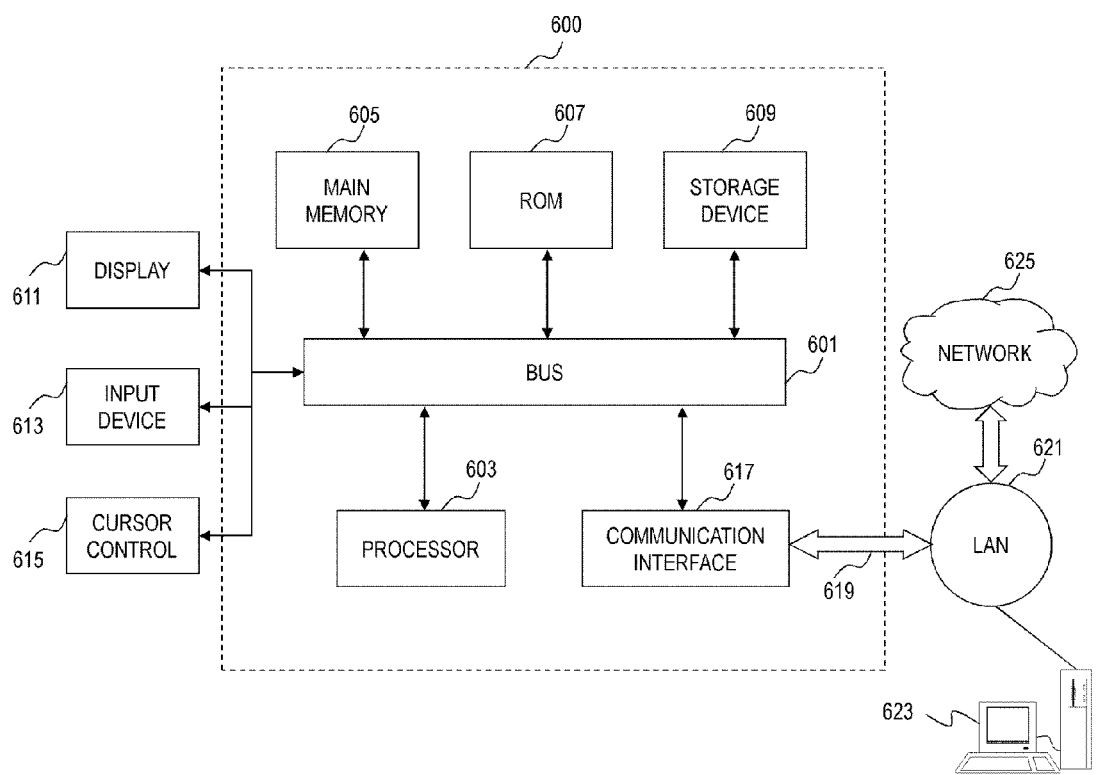
FIG. 6 illustrates an exemplary computing hardware (e.g., computer system) upon which an embodiment according to the invention can be implemented.

FIG. 6 illustrates computing hardware (e.g., computer system) 600 upon which an embodiment according to the invention can be implemented. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

The present disclosure is also directed to achieving efficient use of a storage space and to reducing load on a search engine by detecting a trap of web-based perpetual calendar pages and deleting the web pages collected due to the web trap from a retrieval database.

The present disclosure is also directed to generation of a regular expression for detecting the trap of web-based perpetual calendar pages and application of the regular expression to a web crawler in order to achieve efficient collection of web pages.

In accordance with one aspect of the present disclosure, a method of detecting a trap of web-based perpetual calendar pages includes clustering, according to a predetermined standard, Uniform Resource Locators (URLs) corresponding to web pages stored in a database; generating a regular expression by analyzing a date pattern included in a clustering result; and detecting a cluster suspected of being a trap of web-based perpetual calendar pages using the generated regular expression.

In accordance with another aspect of the present disclosure, a system for detecting a trap of web-based perpetual calendar pages includes a clustering module which clusters, according to a predetermined standard, Uniform Resource Locators (URLs) corresponding to web pages stored in a database, a date pattern detection module which analyzes a date pattern included in a clustering result to generate a regular expression, and a web trap identification module which detects a cluster suspected of being a trap of web-based perpetual calendar pages using the generated regular expression.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of detecting a web trap, the method comprising:
    regularizing uniform resource locators (URLs) based on a date pattern defined in a select URL;
    clustering the URLs corresponding to a web page stored in a database according to a predetermined standard based on the regularized URLs;
    generating a regular expression by analyzing the date pattern associated with the select URL in a clustering result; and
    detecting at least one unwanted URL being suspected of causing an unwanted number of requests associated with linking dynamic pages of a web-based calendar by using the generated regular expression.

2. The method of claim 1, wherein the clustering is performed by applying, according to the predetermined standard, host clustering to cluster the URLs according to a hostname such that URLs having the same hostname are gathered in the same cluster, path clustering to regularize paths of the URLs by replacing numerals using replacers in each path of the URLs, parameter clustering to regularize parameters of the URLs or any combination thereof.

3. The method of claim 1, wherein generating the regular expression comprises:
    comparing a date pattern of a certain URL in the clustering result with a pre-stored date pattern to anticipate the date pattern of the URL;
    determining whether the anticipated date pattern of the URL can be applied to all other URLs in the clustering result; and
    generating the regular expression based on the date pattern of the URL if the anticipated date pattern of the URL can be applied to all other URLs in the clustering result.

4. The method of claim 3, wherein if a numeral corresponding to a location of year in the URL is an integer greater than '0' and a numeral corresponding to a location of month in the URL is an integer from '1' to '12,' the anticipated date pattern of the URL can be applied to all other URLs in the clustering result.

5. The method of claim 1, wherein the detection of the at least one unwanted URL comprises:
    generating a predetermined number of URLs corresponding to certain dates using the generated regular expression;

accessing the generated URLs; and detecting the clustering result related to the regular expression as a trap candidate cluster which corresponds to the suspected cluster, if accessing the generated URLs succeeds.

6. The method of claim 5, wherein the detection of the at least one unwanted URL further comprises:

clustering web pages corresponding to the clustering result according to a size of the respective web pages; and detecting a cluster which satisfies a predetermined detection condition as a trap candidate cluster.

7. The method of claim 6, wherein the detection of the at least one unwanted URL further comprises calculating a minimum size and a maximum size of the respective web pages associated with the trap candidate cluster.

8. The method of claim 7, further comprising:

deleting web pages from the database subsequent to detection of the suspected cluster, wherein the deleted web pages correspond to URLs obtained by inputting certain dates to the regular expression, to web pages ranging from the minimum size to the maximum size, or to both the URLs obtained by inputting certain dates to the regular expression and the web pages ranging from the minimum size to the maximum size.

9. The method of claim 1, further comprising:

checking the URLs to exclude a URL from the URLs corresponding to the web pages stored in the database prior to clustering the URLs, wherein the excluded URL does not satisfy the predetermined standard.

10. The method of claim 7, wherein the predetermined standard is determined according to whether or not a URL has all of five numerals in the URL and four or more numerals are consecutively arrange in the URL.

11. A system for detecting a trap of web-based calendar pages, the system comprising:

a clustering module configured to regularize uniform resource locators (URLs) based on a date pattern defined in a select URL, and to cluster the URLs corresponding to web pages stored in a database according to a predetermined standard based on the regularized URLs;

a date pattern detection module configured to analyze the date pattern associated with the select URL in a clustering result to generate a regular expression; and a web trap identification module configured to detect a suspected cluster which causes an unwanted number of requests associated with linking dynamic pages of web-based calendar by using the generated regular expression.

12. The system of claim 11, wherein the clustering module is configured to apply, according to the predetermined standard, host clustering to cluster the URLs according to a hostname such that URLs having the same hostname are gathered in the same cluster, path clustering to regularize paths of the URLs by replacing numerals using replacers in each path of the URLs, parameter clustering to regularize parameters of the URLs or any combination thereof.

13. The system of claim 11, wherein the date pattern detection module is configured to compare a date pattern of a certain URL in the clustering result with a pre-stored date pattern to anticipate the date pattern of the URL, to determine whether the anticipated date pattern of the URL can be applied to all other URLs in the clustering result, and to generate the regular expression based on the date pattern of the URL if the anticipated date pattern of the URL can be applied to all other URLs in the clustering result.

14. The system of claim 11, wherein the web trap identification module is configured to generate a predetermined number of URLs corresponding to certain dates using the generated regular expression, to access the generated URLs, and to detect the clustering result related to the regular expression as a trap candidate cluster which corresponds to the suspected cluster if access the generated URLs succeeds.

15. The system of claim 14, wherein the web trap identification module is configured to cluster web pages corresponding to the clustering result according to a size of the respective web pages, and to detect a cluster of web pages which satisfies a predetermined detection condition as a trap candidate cluster.

16. The system of claim 15, wherein the web trap identification module is configured to calculate a minimum size and a maximum size of the respective web pages associated with the trap candidate cluster.

17. The system of claim 16, further comprising:

a regular expression application module is configured to delete web pages from the database, the deleted web pages corresponding to URLs obtained by inputting certain dates to the regular expression, web pages ranging from the minimum size to the maximum size of the respective web pages.

18. The system of claim 11, further comprising:

a URL check module configured to exclude a URL from the URLs corresponding to the web pages stored in the database, wherein the excluded URL does not satisfy the predetermined standard.

19. A non-transitory computer-readable storage medium comprising an executable program, which when executed performs the step of:

regularizing uniform resource locators (URLs) based on a date pattern defined in a select URL;

clustering the URLs corresponding to web pages stored in a database according to a predetermined standard based on the regularized URLs;

generating a regular expression by analyzing the date pattern associated with the select URL in a clustering result; and detecting a suspected cluster that is suspected of causing an unwanted number of requests associated with linking dynamic pages of a web-based calendar by using the generated regular expression.

* * * * *